United States Patent [19]

Berke et al.

[11] Patent Number: 5,622,558

[45] Date of Patent: *Apr. 22, 1997

[54] DRYING SHRINKAGE CEMENT ADMIXTURE

[75] Inventors: Neal S. Berke, Chelmsford, Mass.; Michael P. Dallaire, Dover, N.H.

[73] Assignee: W.R. Grace & Co.-Conn, New York, N.Y.

[ * ] Notice: The term of this patent shall not extend beyond the expiration date of Pat. No. 5,571,319.

[21] Appl. No.: 529,391

[22] Filed: Sep. 18, 1995

[51] Int. Cl.$^6$ .......................... C04B 22/00; C04B 24/02

[52] U.S. Cl. .................... 106/802; 106/737; 106/819; 106/823; 106/287.26; 106/287.34

[58] Field of Search ................... 106/724, 737, 106/802, 738, 817, 819, 823, 287.26, 287.34

[56] References Cited

U.S. PATENT DOCUMENTS

| | | |
|---|---|---|
| 3,486,916 | 12/1969 | Cordon . |
| 3,583,880 | 6/1971 | Moren . |
| 3,709,707 | 1/1973 | Rehmar . |
| 4,141,737 | 2/1979 | Moon . |
| 4,302,251 | 11/1981 | Udagawa . |
| 4,547,223 | 10/1985 | Goto . |
| 4,946,904 | 8/1990 | Akimoto . |
| 4,975,121 | 12/1990 | Sakuta . |
| 5,016,711 | 5/1991 | Cowan . |
| 5,020,598 | 6/1991 | Cowan . |
| 5,174,820 | 12/1992 | Sakuta . |
| 5,176,752 | 1/1993 | Scheiner ................... 106/737 |
| 5,181,961 | 1/1993 | Umaki . |
| 5,356,671 | 10/1994 | Drs ........................... 106/802 |
| 5,413,634 | 5/1995 | Shawl . |
| 5,472,501 | 12/1995 | Dastol ....................... 106/823 |

FOREIGN PATENT DOCUMENTS

| | | |
|---|---|---|
| 308950A1 | 3/1989 | European Pat. Off. . |
| 643022A1 | 3/1995 | European Pat. Off. . |
| 46-76310 | 10/1971 | Japan . |
| 54-110903 | 8/1979 | Japan . |
| 55-027819 | 2/1980 | Japan . |
| 56-500786 | 6/1981 | Japan . |
| 57-129880 | 7/1982 | Japan . |
| 57-145054 | 9/1982 | Japan . |
| 58-60293 | 4/1983 | Japan . |
| 59-128240 | 7/1984 | Japan . |
| 59-128242 | 7/1984 | Japan . |
| 59-128251 | 7/1984 | Japan . |
| 59-131552 | 7/1984 | Japan . |
| 59-137383 | 8/1984 | Japan . |
| 1145357 | 6/1989 | Japan . |
| 2051461 | 7/1990 | Japan . |

OTHER PUBLICATIONS

Hackh's et al., "Chemical Dictionary", Fifth edition, 1987, McGraw Hill, Inc., pp. 462–463.

*Primary Examiner*—Mark L. Bell
*Assistant Examiner*—Michael Marcheschi

[57] ABSTRACT

A cement admixture composition composed of a mixture of alkylene glycol and fume silica to provide a means of inhibiting drying shrinkage and enhancing compressive strength.

18 Claims, No Drawings

5,622,558

DRYING SHRINKAGE CEMENT ADMIXTURE

BACKGROUND OF THE INVENTION

The present invention is directed to a cement admixture composition capable of causing the combined effects of inhibiting drying shrinkage of concrete compositions while enhancing the compressive strength of the fully set composition. The present invention further provides an improved concrete composition structural product.

Specifically, the present invention is directed to a cement admixture composed of a synergistic combination of certain alkylene glycols and fumed silica as fully described hereinbelow.

Hydraulic cement compositions, such as mortar (cement, small particulate, e.g. sand, and water), or concrete (cement, small particulate, large particulate, e.g. gravel, and water), have certain properties which substantially effect their durability. These properties include shrinkage which normally occurs during drying of the cement composition. In addition, mortars and, in particular, concrete composition are used for structural applications where enhanced strength of the cured structural member is highly desired.

Conventional hydraulic cement compositions display a decrease in volume with setting and drying of the cast composition. Although the magnitude of the volume decrease is normally small, it is of extreme importance. This shrinkage results in cracks and other defects which lower the serviceability and durability of the resultant structure. The cracks provide a path for air to penetrate into the structure, promoting carbonation of the cement and corrosion of the metal reinforcing bars contained therein. Further, the cracks provide a means for water to seep into and through the structure. Such water entry further deteriorates the structure through freeze-thaw cycling pressures exerted on the cement structure over its life. It is highly desired to provide a cement which exhibits high strength and is not subject to deterioration effects due to shrinkage and freeze-thaw cycling.

Various attempts have been made to avoid the cracking phenomenon caused by drying shrinkage. These include providing joints in the cement structure to concentrate the site of crack formation at the joint and, thereby, minimize such formation at other portions of the structure. Such joints are expensive to install; are not applicable to certain structures such as vertical walls, pillars and the like; and merely concentrate the area of cracking but do not alleviate it.

Other attempts include varying the composition of the cement, varying the methods of manufacture of concrete mix and varying the ballast material used in forming the resultant concrete structure. None of these attempts have resulted in a satisfactory solution. For example, cements have been formulated with expansive admixtures in attempts to counter the shrinkage of the concrete. However, it is difficult to determine the proper amount of expansive admixture required to counter the drying shrinkage which develops. The use of such materials thereby give rise to unpredictable results.

With respect to overcoming the drying shrinkage of cement compositions, such as concrete compositions, the literature teaches that various oxyalkylene adducts are suitable for this purpose. For example, U.S. Pat. Nos. 3,663,251 and 4,547,223 suggest the use of compounds of the general formula $RO(AO)_nH$ in which R may be a $C_{1-7}$ alkyl or $C_{5-6}$ cycloalkyl radical, A may be $C_{2-3}$ alkylene radicals and n is 1–10, as shrinkage reducing additives for cement. Similarly, U.S. Pat. No. 5,174,820 suggests terminally alkyletherified or alkylesterified oxyalkylene polymers as useful for shrinkage reduction. Still further, Japanese Patent Application 58-60293 provides the suggestion that shrinkage reduction of cement can be accomplished by the addition thereto of compounds which are aliphatic, alicyclic or aromatic group terminated oxyethylene and/or oxypropylene repeating chain compounds.

One of the main advantages of using concrete compositions, to form architectural structural members is their ability to be cast into a desired form which is capable of exhibiting high compressive strength. With this in mind, the artisan does not desire to utilize admixtures or other ingredients which cause a decrease in such strength.

It is highly desired to provide a cement admixture which is capable of inhibiting drying shrinkage of structural concrete compositions while enhancing the compressive strength of the resultant cured structure.

Alkylene glycols and glycerols have been used in combination with cement compositions for particular purposes. For example, these materials have been added to inhibit water crystal formation when casting in cold climate conditions or to inhibit the rate of evaporation of water in cement slurries used in high temperature well bore hole applications. Further, these additives have been used to provide a layer above cast, unset cement composition to inhibit evaporation of water at the surface portion of the structure and thereby enhancing the hydration of the cement at that portion of the formation.

The above compounds, when made part of an unset composition, cause the resultant cured composition to exhibit lower compressive strength than its untreated counterpart. When the cement composition is a concrete which is used to provide architectural structural members for buildings, parking garages, bridge decks and the like, it is essential that the concrete member exhibit high compressive strength than its untreated counterpart. Therefore, shrinkage reducing additives which decrease the strength of the cured product have not found favor even though they inhibit cracking in the member as discussed above.

SUMMARY OF THE INVENTION

The present invention is directed to a cement admixture, and a method of forming an improved structural concrete formation, which is capable of inhibiting drying shrinkage and causing enhanced compressive strength to the treated formation. The admixture comprises a synergistic mixture of a lower alkylene glycol or poly(oxyalkylene)glycol in combination with fumed silica.

DETAILED DESCRIPTION

It has been unexpectedly found that when the specific combination described herein of diol compounds and fumed silica are used, one attains the desired combination of inhibition of dying shrinkage and enhanced compressive strength over that attributable to either of the present components with respect to the resultant concrete structure.

The present unique combination of compounds forming the subject cement admixture requires the use of an alkylene glycol represented by the general formula HOBOH (Formula I) wherein B represents a $C_3$–$C_{12}$ alkylene group, preferably a $C_5$–$C_8$ alkylene group. Examples of such glycols are 1,6 hexanediol, 1,5-pentanediol, 1,4-pentanediol, 2-methyl-2,4-pentanediol and the like. The preferred diols are secondary and/or tertiary dihydroxy $C_5$–$C_8$ alkanes which are represented by the formula:

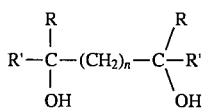

wherein each R independently represents a hydrogen atom or a $C_1$–$C_2$ alkyl group, each R' represents a $C_1$–$C_2$ alkyl group and n represents an integer or 1 or 2. The most preferred compound is 2-methyl-2,4-pentanediol.

Alternately, the alkylene glycols found useful in the present invention are condensed alkylene glycols which is represented by the formula $HO(AO)_xH$ (Formula III) where A represents a $C_2$–$C_4$ alkylene group, such as ethylene, propylene, isopropylene, butylene and the like and mixtures thereof with $C_2$ and $C_3$ alkylene groups preferred; O represents an oxygen atom and x is an integer of from 1 to about 20, preferably from 1 to 10, provided the diol is soluble in water. The AO group in a particular glycol molecule may all the the same or may be different. Examples of such glycols include diethylene glycol, dipropylene glycol, tripropylene glycol, di(oxyethylene)di(oxypropylene) glycol as well as poly(oxyalkylene) glycols having molecular weight of up to about 1200. The AO groups of such polyoxyalkylene glycols may be of single alkylene or a mixture of alkylene groups which are in either block or random configuration.

The silica fume found useful in the present invention is an amorphous silica by-product, such as formed during conventional silicon and ferrosilicon metal alloy production or derived from the pyrolysis of rice hulls and the like. The term "silica fume", as used in the present application and the appended claims, is a micro-particulate by-product material retrieved from the stack gases of electric arc furnaces or the like during production of a silicon or ferrosilicon alloy in which the iron to silicon metal content is in a ratio of from about 0:100 to about 30:70 or derived from the pyrolysis of rice hulls or calcined amorphous alumina-silica clays (e.g. meta-kaolin) and the like.

The main constituent of the subject silica fume is silicon dioxide present in from about 86 to about 95 percent by weight. The analysis and properties of a typical silica fume obtained from ferro-silicon alloy production is shown below:

| Component | % by weight |
| --- | --- |
| $SiO_2$ | 86–90 |
| SiC | 0.1–0.4 |
| $Fe_2O_3$ | 0.3–5.0 |
| $TiO_2$ | 0.002–0.006 |
| $Al_2O_3$ | 0.2–1.7 |
| MgO | 1.0–3.5 |
| CaO | 0.2–0.5 |
| $Na_2O$ | 0.3–1.8 |
| $K_2O$ | 1.5–3.5 |
| S | 0.2–0.4 |
| C | 0.8–2.3 |
| P | 0.3– |
| Ignition loss (1000° C.) | 2.4–4.0 |
| Bulk density, from bunker, g/L | 200–300 |
| Bulk density, compacted, g/L | 500–700 |
| Real density, g/cm$^3$ | 2.20– |
| Specific surface, m$^2$/g | 18–22 |
| Primary particle size, percentage <1 μm | 90 |

Fumed silica is a light, fluffy material which is somewhat difficult to handle as a dry powder. However, silica fume can be readily dispersed in aqueous solutions which have up to about 75 weight percent silica-fume therein.

The aqueous composition containing the above-described glycols and silica fume can be further enhanced to provide a stable, fluid dispersion having extended storage capabilities by including a stabilizing amount of a mineral acid, such as phosphoric acids, polyphosphoric acid, sulfuric acid, hydrofluoric acid, fluorosilicic acid and the like as well as acidic dispersants such as naphthalene sulfonate or melamine sulfonate formaldehyde condensates and the like. Alternately, the subject composition can contain stabilizing amounts of an alpha, beta amino alcohol, as described in U.S. Pat. No. 5,176,752, the teaching of which is incorporated hereby by reference.

It is generally known that hydroxy containing compounds of the present invention depress the compressive strength of a treated cement composition and also deactivate the beneficial effects normally attained by conventional strength enhancing additives. It has been unexpectedly found that the hydroxy containing alkylene diols of the present invention can be combined with the subject silica fume to form an admixture which provides inhibition to drying shrinkage and a resultant structural formation which exhibits enhance compressive strength above that attributable from the combined components.

The subject admixture should be in the form of an aqueous composition containing the above-described alkylene glycol and silica fume. The composition should contain the alkylene glycol and silica fume in a weight ratio of from about 10:1 to 1:10 and, preferably from about 1:1 to 1:5. The aqueous composition contains the alkylene glycol and silica fume components in a combined weight percent of from about 10 to 75 percent based on the total weight of the solution formed. It should be understood that the water content of the subject admixture should be taken into account when calculating the water needed to provide a specific target water to cement ratio. When the glycol is the major constituent of the mixture, such as 1:1 to 10:1, one can use little or no water in forming the admixture composition.

The admixture composition of the present invention may be used with hydraulic cements suitable for architectural structural application, such as ordinary, quick-hardening and moderate-heat portland cements, high alumina cements, blast-furnace slag cement and the like. Of these, portland cements of the ordinary and quick-hardening types are particularly desired and most readily used to form architectural structural members.

The cement admixture of the present invention should be present in from about 2 to about 25, preferably about 5 to about 10 and most preferably from about 7 to about 9 weight percent solid material based on the weight of cement content of the cement composition being treated. The quantity of water used for setting the cement composition can vary within the weight ratios of water to cement of from 0.25:1 to 0.7:1, preferably 0.3:1 to 0.5:1. Aggregate, such as pebble, gravel, sand, pumice or fired perlite, as required may be employed in conventional amounts.

The improved cement of the present invention is composed of a substantially uniform mixture of a hydraulic cement and the subject cement admixture. The improved cement may be formed at any stage of the cement's formation or use, such as by applying the admixture to cement powder during the blending with other dry materials to prepare a specific type of cement. Although small amounts of water may be present during the blending, the amount of water will be insufficient to cause substantial hydration of the cement.

Alternately, an improved cement composition can be formed in situ during the course of preparing a cement composition such as a mortar mix or a concrete. The admixture composition can be added either separately or as part of the water of hydration. When the admixture is in the form of an aqueous solution, the water content of the solution should be calculated as part of the total water content of the cement composition.

Various conventional ingredients may be optionally used. Among the optionally employable ingredients are: conventional hardening accelerators, e.g. metal chlorides such as calcium chloride and sodium chloride, metal sulfates, such as sodium sulfate, and organic amines such as triethanolamine; ordinary hardening retarders, e.g. alcohols, sugars, starch and cellulose; reinforcing-steel corrosion inhibitors, such as a sodium nitrate and calcium nitrite; water reducing agents and high-range water reducers, such as lignosulfonic acids and their salts, and derivatives, hydroxylated carboxylic acids and their salts, condensation products of naphthalenesulfonic acids and formalic, sulfonated melamine polycondensation products, amines and their derivatives, alkanolamines, and inorganic salts such as borates, phosphates, chlorides and nitrates and the like. The quantity of such an optional ingredient or ingredients is usually 0.05–6% by weight of the cement.

The addition of the cement admixture composition of the present invention to a cement will markedly reduce the drying shrinkage of the resulting cement composition (e.g. mortar and concrete) and will exhibit enhanced compressive strength compared with that of untreated composition or relative to cement composition having only one of the components of the present admixture.

The following examples are given for illustrative purposes only and are not meant to be a limitation on the invention, as defined by the claims appended hereto. All parts and percentages are by weight unless otherwise indicated. The symbol "S/S" indicates weight percent dosage of solid additive based on solid cement contained in the resultant composition.

EXAMPLE 1

Concrete samples were formed using a concrete mixture design proportioned by a volumetric method according to ACI guidelines. The design requirements were based on 412 parts Type II Portland cement, 115 parts fly ash, 1230 parts Lime Rock fine aggregate, 1845 parts 0.75 inch Florida lime rock, 148 oz/yd$^3$ of concrete mix of naphthalene sulphonate-formaldehyde water-reducing agent, and 189 parts water (including water of silica fume slurry). The water and small aggregate contents were further adjusted to project a design parameter of 2% air content, 0.33:1 water to cement ratio and slump of about 4".

The water, coarse aggregate and fine aggregate and 50% aqueous silica fume slurry or silica fume/glycol slurry were initially charged into a concrete mixer and mixed for one minute. The Portland cement and fly ash were then added and mixing was continued for an additional three minutes. The concrete samples were then permitted to rest for three minutes followed by a final two minutes of mixing. The resultant concrete samples were tested according to ASTM C-143 for slump, ASTM C-138 for weight and yield, ASTM C-231 for air content of freshly mixed samples.

The results of Table I compare a concrete composition containing 11% S/S silica fume to the same composition containing 11% S/S silica fume and 2% S/S polyoxypropylene glycol having a molecular weight of about 425.

The results show that Sample 2, formed according to the present invention, provides a 20% increase in early strength and a 50% decrease in drying shrinkage with respect to a standard concrete sample having only silica fume added.

TABLE 2

| Mix | Slump | Plastic Air % | 1-day Compressive strength (psi) | 7-day Compressive strength | 28-day Compressive strength | ASTM C157* free shrinkage length change at 56 days |
|---|---|---|---|---|---|---|
| 11% S/S Silica Fume | 3 | 1.9 | 1605 | 6150 | 8250 | 0.037% |
| 11% S/S silica Fume & 2% S/S Glycol | 3 | 2.7 | 1930 | 5450 | 7425 | 0.019% |

*lower number indicates reduced dry shrinkage

EXAMPLE 2

Concrete samples were formed and tested according to the methods described in Example 1 above except that the concrete mix design comprised 336 parts Type I Lehigh II cement, 183 parts ground slag, 1300 parts Goose Bay fine aggregate, 1800 parts Goose Bay coarse aggregate, 155 oz/cu.yd concrete mix of a superplasticizer (Daracem-100 by W. R. Grace & Co.) and 183 parts water. The mixtures had design parameters of water to cement ration of 0.34, initial slump of 8 inch and mixing temperature of 90° F. The results are given in Table II below.

TABLE II

| Mix | Slump | Plastic Air % | 1-day Compressive strength (psi) | 7-day Compressive strength | 28-day Compressive strength | ASTM C157* free shrinkage length change at 56 days |
|---|---|---|---|---|---|---|
| 12% S/S Fume Silica | 8" | 7.6 | 1220 | 4975 | 5580 | 0.035% |
| 12% S/S FS + 2% S/S Glycol | 7.25" | 3.5 | 1970 | 5850 | 7490 | 0.014% |

The results of Table II shows that the concrete treated with a combination of 12% S/S fume silica and 2% S/S polypropylene glycol (MW 425) provided enhanced compressive strength and reduced drying shrinkage when compared to a concrete having only 12% S/S fume silica.

EXAMPLE 3

Mortar mixes were formed according to ASTM C-490 and C-185 by introducing 2.7 parts sand and 1.0 part portland cement into a mixer followed by addition of 0.42 part water. A second mix was formed in which a silica fume slurry was added at the same time as the water and the water content of the slurry was accounted or as part of the water content of the mix to provide the same total water content. A third mix was formed in the same manner as the referenced samples above except that the silica fume slurry contained a condensed alkylene glycol, polyoxypropylene glycol having a molecular weight of 425 and a stabilizer, napthalene sulfonate-formaldehyde.

The results are given in Table III below. The data shows that the combination of silica fume and alkylene glycol (Example 3 provides a combination of enhanced strength and reduction of shrinkage) (a positive value indicates reduction while a negative value indicates an increase in shrinkage compared to the referenced Example 1).

TABLE III

| Sample | Additive | Dosage % S/S | Plastic Flow | Air % | Compressive strength PSI 1 Day | 7 Day | 28 Day | ASTM C157* Shrinkage Reduction % |
|---|---|---|---|---|---|---|---|---|
| 1 | — | — | 106 | 3.7 | 3555 | 5900 | 7330 | — |
| 2 | Silica Fume | 7.5 | 72 | 4.6 | 5480 | 8700 | 10280 | −30% |
| 3 | Silica Fume PPG/NSF | 7.5 2.3 0.6 | 121 | 1.4 | 3870 | 8015 | 9025 | 6% |

*negative percent represents increase in shrinkage
positive percent represents beneficial decrease in shrinkage

What is claimed is:

1. A cement admixture capable of inhibiting drying shrinkage of a cement composition and enhancing compressive strength of a formation formed from said composition, comprising an aqueous composition containing from 10 to 75 weight percent of a mixture of
   (A). at least one (i) glycol selected from $C_3$–$C_{12}$ alkylene glycol or (ii) water-soluble condensed alkylene glycol represented by the formula $HO(AO)_xH$ wherein A is a $C_2$–$C_4$ alkylene or mixtures thereof, O is oxygen and x is a value of from 1 to 20, and mixtures thereof; and
   (B). silica fume
wherein said components (A) and (B) are in a weight ratio of from 10:1 to 1:10.

2. The admixture of claim 1 wherein said $C_3$–$C_{12}$ alkylene glycol is represented by the formula HOBOH wherein B is a $C_5$–$C_8$ alkylene group.

3. The admixture of claim 2 wherein said $C_3$–$C_{12}$ alkylene glycol is represented by the formula

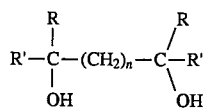

wherein each R represents a hydrogen atom or $C_1$–$C_{12}$ alkyl; each R' represents $C_1$–$C_2$ alkyl; and n represents 1 or 2.

4. The admixture of claim 3 wherein said $C_3$–$C_{12}$ alkylene glycol is 2-methyl-2,4-pentanediol.

5. The admixture of claim 1 wherein the component (B) is a silica fume by-product of silicon and/or ferrosilicon metal alloy production and the weight ratio of components (A) to (B) is from about 1:1 to 1:5.

6. The admixture of claim 2 wherein the component (B) is a silica fume by-product of silicon and/or ferrosilicon metal alloy production and the weight ratio of component (A) to (B) is from 1:1 to 1:5.

7. The admixture of claim 1 wherein said condensed alkylene glycol is represented by the formula $HO(AO)_xH$ wherein A is a $C_2$–$C_3$ alkylene or mixtures thereof, O is oxygen and x is a value of 1 to 10.

8. The admixture of claim 7 wherein the component (B) is a silica fume by-product of silicon and/or ferrosilicon metal alloy production and the weight ratio of component (A) to (B) is from 1:1 to 1:5.

9. The admixture of claim 1 wherein the aqueous composition further contains a stabilizing amount of an alpha, beta-amino alcohol.

10. A method of inhibiting drying shrinkage of a cement composition while improving compressive strength of an architectural structural formation formed therewith comprising (i) forming a cement composition composed of a hydraulic cement, fine aggregate, coarse aggregate and water with a water to cement weight ratio of from 0.25:1 to 0.7:1;
   (ii) adding to said cement composition a cement admixture comprising
      (A) at least one glycol selected from (i) $C_3$–$C_{12}$ alkylene glycol or (ii) water-soluble condensed alkylene glycol represented by the formula $HO(AO)_xH$ wherein A is a $C_2$–$C_4$ alkylene or mixtures thereof, O is oxygen and x is a value of from 1 to 20 or mixtures thereof; and
      (B) silica fume
   wherein said components (A) and (B) are in a weight ratio of from 10:1 to 1:10; said cement admixture is added in an amount of from 2 to 25 weight percent based on the weight of the hydraulic cement in said composition.

11. The method of claim 10 wherein said $C_3$–$C_{12}$ alkylene glycol is represented by the formula HOBOH wherein B is a $C_5$–$C_8$ alkylene group.

12. The method of claim 1 wherein said $C_3$–$C_{12}$ alkylene glycol is represented by the formula

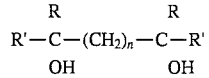
                                II wherein each R represents a hydrogen atom or $C_1$–$C_2$ alkyl; each R' represents $C_1$–$C_2$ alkyl; and n represents 1 or 2.

13. The method of claim 12 wherein said $C_3$–$C_{12}$ alkylene glycol is 2-methyl-2,4-pentanediol.

14. The method of claim 10 wherein the component (B) is a silica fume by-product of silicon and/or ferrosilicon metal alloy production and the weight ratio of components (A) to (B) is from about 1:1 to 1:5.

15. The method of claim 14 wherein the component (B) is a silica fume by-product of silicon and/or ferrosilicon metal alloy production and the weight of components (A) to (B) is from 1:1 to 1:5.

16. The method of claim 10 wherein said condensed alkylene glycol is represented by the formula $HO(AO)_xH$ wherein A is a $C_2$–$C_3$ alkylene or mixture thereof, O is oxygen and x is a value of 1 to 10.

17. The method of claim 16 wherein the component (B) is a silica fume by-product of silicon and/or ferrosilicon metal alloy production and the weight ratio of component (A) to (B) is from 1:1 to 1:5.

18. The method of claim 10 wherein the admixture further contains a stabilizing amount of an alpha, beta-aminoalcohol.

* * * * *